Nov. 21, 1950
C. G. MATLAND ET AL
2,530,979
RADIO FREQUENCY CONTROL SYSTEM
Filed Sept. 27, 1945
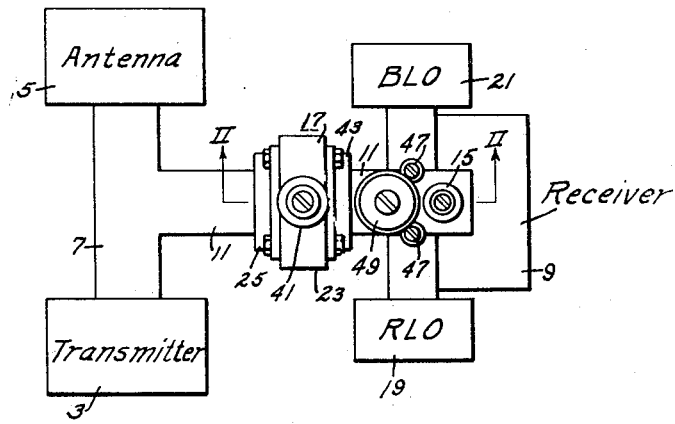
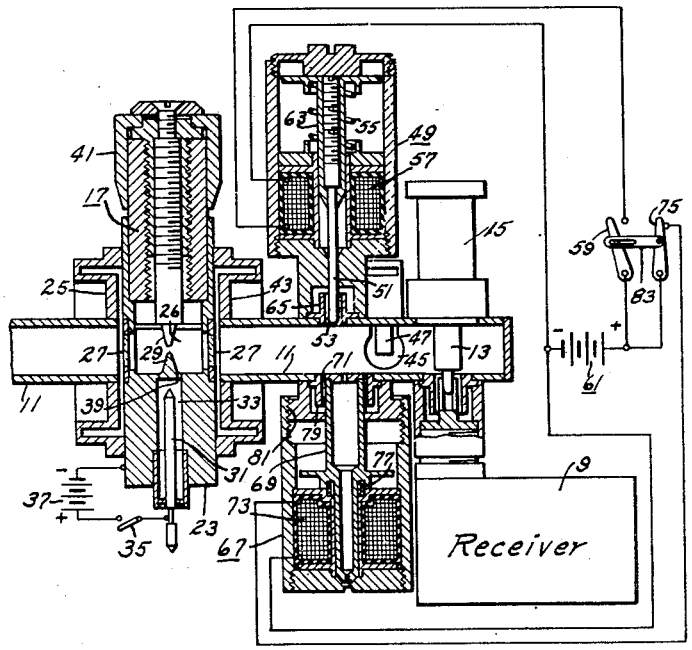
INVENTORS
Carl G. Matland and
Leon Katz.

Patented Nov. 21, 1950

2,530,979

UNITED STATES PATENT OFFICE 2,530,979

RADIO FREQUENCY CONTROL SYSTEM

Carl G. Matland, New York, N. Y., and Leon Katz, Forest Hills, Pa., assignors to Westinghouse Electric Corporation, East Pittsburgh, Pa., a corporation of Pennsylvania Application September 27, 1945, Serial No. 618,968

19 Claims. (Cl. 343—6)

This invention relates to a transmission system for electromagnetic waves and has particular relation to a system for use in radar equipment.

In the usual single antenna radar equipment, a transmitter is employed to develop high power signals in the form of pulses of ultra-high frequency electromagnetic energy. These pulses are conducted from the transmitter to the antenna through a suitable transmission line, such as a hollow wave guide. From the antenna the signals are propagated in a known direction. Upon striking an object the signals are reflected and the reflected signals are picked up by the antenna. The reflected signals, of course, are of a comparatively low power.

A receiving system for the reflected low power signals is also connected to the antenna by a coupling to the guide between the transmitter and the antenna. The receiving system comprises a local oscillator, a crystal mixer for receiving and mixing the reflected signals with the output of the local oscillator, and a receiver circuit including suitable amplifiers and indicators to which the output of the mixer is applied.

Since the high power signals introduced by the transmitter into the guide between the transmitter and antenna would be highly detrimental to the receiving system, a transmitter-receiver switch is interposed between the main guide and the receiving system. The purpose of the transmitter-receiver switch is to permit the low power reflected signals to pass to the receiver, but to prevent the high power signals from the transmitter from passing therethrough in sufficient strength to damage the receiver. The usual transmitter-receiver switch comprises a cavity resonator having a low pressure electrode gap therein. The cavity resonator is tuned to the frequency of the electromagnetic waves of the radar signals. When the low power reflected signals are supplied to the resonator of the transmitter-receiver switch, it functions as an effective highly resonant circuit having a high Q, that is, a high ratio of the energy stored to the energy lost per cycle, and permits the transmission of the reflected signals therethrough to the receiving system.

On the other hand, high power signals from the transmitter cause an electric discharge to be established across the electrode gap in the resonator of the transmitter-receiver switch which changes the resonator from an effective resonant circuit to a non-resonant one having an extremely low Q. Consequently, the transmitter-receiver switch reflects most of the electromagnetic waves of the signal from the transmitter and prevents passage thereof to the receiving system.

It has been found desirable in many cases to provide a beacon system in conjunction with the usual radar equipment especially where the radar equipment is mounted on a mobile unit, such as a ship or an airplane. Such a combined arrangement performs the usual functions of radar equipment and, in addition, gives homing or position information to its operator. In a typical arrangement, several fixed ultra-high frequency transmitters, called beacon transmitters, are located at known points. These beacon transmitters are capable of transmitting a coded set of signals which will convey to the operator information respecting his position. Operation of a beacon transmitter may be initiated by the receipt at the beacon station of a series of coded signals transmitted from the radar equipment.

The beacon signals are transmitted at a different electromagnetic wave frequency than the radar signals to avoid any conflict in the receiver between the two signals. The difference in electromagnetic wave frequency of the beacon and radar signals is sometimes as much as 130 megacycles. Since the same antenna, transmitter-receiver switch and receiving system are used for the reception of both the reflected radar signals, and the beacon signals, it is apparent that unless the radar apparatus has a very broad frequency band, the beacon signal will not be received with the same sensitivity as the radar signal. But the transmitter-receiver switch is very frequency sensitive since it has a very high Q with respect to the transmission therethrough of the radar frequency signals. It follows that the transmitter-receiver switch is considerably off resonance with respect to the beacon frequency signals. In typical beacon radar apparatus, the insertion loss for the beacon signal is as high as 15 to 18 decibels as compared with a loss of one decibel for the radar signal. Such a great loss of beacon signal power definitely limits the reliability and range of the present beacon systems.

It has also been found that the crystal of the receiving system of radar equipment, and particularly of mobile radar equipment, is often burned out while the equipment is not actually in use. This results from the reception at the antenna of high power signals from closely adjacent transmitters when the equipment is shut down. Now a small direct current arc is ordinarily provided in the transmitter-receiver switch and is employed during operation of the equipment to provide free electrons to aid in establishing the discharge across the electrode gap upon receipt of a high power signal. But when the equipment is shut down, the direct current arc is discontinued so that the high power signals might not establish an arc in the electrode gap so that the full power is applied to the crystal. It is obviously highly desirable to avoid any such occurrence with the resulting damage to the crystal.

It is, accordingly an object of our invention to provide new and improved apparatus for use with a transmission system for electromagnetic waves for quickly and easily changing the characteristics thereof with respect to ability to conduct electromagnetic waves.

It is a further object of our invention to provide novel apparatus for use in radar equipment whereby both radar and beacon signals may be conducted to the receiving system without substantial attenuation of either.

Another object of our invention is to provide new and improved apparatus for use in radar equipment whereby the crystal of the receiving system is fully protected when the equipment is shut down.

A further object of our invention is to provide new and improved apparatus including a transmitter-receiver switch for use in radar equipment whereby both radar and beacon signals of different frequencies may be transmitted through the switch without substantial attenuation of either.

More specifically, it is an object of our invention to provide novel apparatus including a transmitter-receiver switch for use in radar equipment whereby both radar and beacon signals may be transmitted to the receiving system without substantial attenuation of either and with full protection to the crystal when the equipment is shut down.

In accordance with our invention, we provide apparatus which is operable to cause the characteristics of the system including the cavity resonator of the transmitter-receiver switch to be changed either to retune the system from the radar frequency to the beacon frequency or substantially to prevent passage of waves through the system. The change is accomplished by inexpensive apparatus of rugged construction and may be made quickly and easily from a remote point. The retuning to the beacon frequency is arranged to permit passage through the transmitter-receiver switch of the beacon signals without substantial attenuation. On the other hand, changing the characteristics of the system to an even greater extent as to prevent substantially the passage of waves therethrough is useful in protecting the crystal of the receiving system when the equipment is shut down.

The features of our invention which we consider novel are set forth with more particularity in the appended claims. The invention itself, however, together with additional objects and advantages thereof, may be best understood from the following description of a specific embodiment when read in connection with the accompanying drawing, in which:

Figure 1 is a schematic diagram of radar equipment embodying our invention; and

Fig. 2 is an enlarged cross-sectional view of the apparatus taken along line II—II of Fig. 1.

As shown in Fig. 1, a transmitter 3 is arranged to provide radar frequency signals to the antenna 5 through a suitable main transmission line, such as a hollow wave guide 7. A receiver 9 is connected to the antenna 7 by means of an auxiliary hollow wave guide 11 coupled to the main guide, and a crystal 13 inserted in the auxiliary guide near the end opposite the main guide and supported by a mounting 15 on the outside thereof. The auxiliary guide 11 is divided into two sections and a transmitter-receiver switch 17 is interposed between the sections. A local oscillator 19 for use with radar signals is coupled to the system between the transmitter-receiver switch 17 and crystal 13. Another local oscillator 21 for use with beacon signals is also coupled to the system between the transmitter-receiver switch 17 and the crystal 13.

As shown in Fig. 2, the section of the auxiliary guide 11, one end of which is coupled to the main guide 7, is connected at its other end to the body 23 of the transmitter-receiver switch 17 by means of a flange 25 which forms a quarter-wave length choke at the coupling joint and is bolted to the body 23. The guide 11 is formed of highly conductive material and is preferably in the shape of a rectangular pipe.

The transmitter-receiver switch 17 and the arrangement for coupling it to a wave guide is shown and described in more detail in the copending application of D. Alpert, Serial No. 480,991, filed March 29, 1943, for an improvement in Ultra-High Frequency Tubes, which issued as Patent No. 2,525,468 on October 10, 1950, and assigned to the assignee of the present application. The switch 17 comprises a hollow body 23 of highly conductive material arranged to form a cavity resonator having a chamber 26. A pair of vacuum-tight glass windows 27 at either side of the body 23 in line with the auxiliary wave guide 11 form an inlet and an outlet for electromagnetic waves passing through the resonator. The interior of the body 23 is evacuated and a pair of electrodes 29 are positioned to form a low pressure electrode gap across the center of the resonator chamber 26. An auxiliary electrode 31 is provided in a small chamber 33 just outside the resonator chamber 26. This auxiliary electrode 31 may be connected through a suitably operated switch 35 to one terminal of a source of direct current voltage, illustrated as a battery 37, the other terminal of which is connected to the body 23 of the transmitter-receiver switch 17. When the switch 35 is closed, a small direct current arc is established between the auxiliary electrode 31 and the body 23 to provide free electrons which may escape through a small opening 39 to the interior of the resonator chamber 26 to facilitate the establishment of an arc between the main electrodes 29.

The resonator is tuned by an adjustable member 41 to the frequency of the transmitter 3. When high power signals of the radar frequency are supplied to the resonator of the transmitter-receiver switch 17, an arc is established between the main electrodes 29 which renders the resonator non-resonant to the radar frequency and substantially prevents transmission of the signals therethrough. When low power radar signals, such as those reflected from an object, are supplied to the transmitter-receiver switch 17, the signals are not sufficiently powerful to establish an arc between the main electrodes 29 and because of the highly resonant condition of the resonator, such signals pass therethrough without substantial attenuation.

The other section of the auxiliary wave guide 11 has one end coupled to the transmitter-receiver switch 17 at the outlet side thereof by means of the usual flange 43 with a quarter-wave choke. The other end of this guide section is closed and the crystal 13 of a suitable form is mounted across the guide 11 at substantially the center of the wider dimension thereof. The position of the crystal 13 and the closed end of the auxiliary guide section are such as to provide a matched load at the output of the transmitter-receiver switch 17.

The output of the beacon local oscillator 21 and that of the radar local oscillator 19 are supplied to the auxiliary guide 11 between the transmitter-receiver switch 17 and the crystal 13 through appropriate openings in the narrower walls of the guide. One of these openings 45 is shown in Fig. 2 and the other is directly opposite and of the same configuration. Of course, only one local oscillator is operated at a time, depending upon whether radar or beacon signals are to be received. Suitable tuning screws 47 are provided at the point of coupling of the local oscillators to the auxiliary guide.

To effect retuning of the transmitter-receiver switch resonator, a first solenoid 49 is mounted on the guide 11 adjacent the resonator and between the resonator and the local oscillation coupling points. The solenoid 49 comprises a conductive member, such as rod or plunger 51, mounted at substantially right angles to the auxiliary guide 11 and in line with an opening 53 in one of the wider walls of the auxiliary guide. The plunger 51 is normally maintained outside the guide 11 in the position illustrated, by a spring 55. However, upon energization of the coil 57 of the solenoid 49 by closing a switch 59 completing a series circuit from a direct current voltage source, such as a battery 61 through the coil 57, the plunger 51 is pulled downward and moved into the guide 11. The amount of movement of the plunger 51 into the guide 11 may be adjusted by varying the threaded connection between the plunger 51 and a stop member 63.

The size of the plunger 51 and the extent of movement thereof into the guide 11 are chosen with respect to the location of the plunger relative to the resonator of the transmitter-receiver switch 17 so that when the plunger 51 is moved into the guide 11, the additional reactance afforded thereby causes the system to be retuned from the radar frequency to the beacon frequency. When the switch 59 in the solenoid coil circuit is opened, the spring 55 forces the plunger 51 back out of the guide 11 and the resonator is again tuned to the radar frequency.

In a specific application of the first solenoid and plunger in a 3.2 centimeter wave length radar system, it was found experimentally that optimum conditions were obtained with a $\frac{3}{32}$ inch plunger at the center of the wide dimension of the guide (i. e. conditions in which the shortest movement of the plunger was necessary and lowest loss was obtained for a given amount of retuning), when the distance from the adjacent surface of the transmitter-receiver switch was .880 inch. With this arrangement, the maximum loss on retuning to a frequency point 130 mc. less than the original frequency point is 4 db. With the same apparatus a loss of 18 db is incurred without retuning of the system. The extent of movement of the plunger depends upon the amount of retuning desired.

To avoid undue leakage of power through the opening 53 in the guide 11, the mounting 65 for the solenoid 49 is arranged to form a quarter-wave choke at the opening 53. Of course, if the opening 53 is provided in the center of a wider wall of a rectangular guide and is not too large, the leakage of power might be sufficiently small that the choke at the opening 53 could be eliminated.

A second solenoid 67 is mounted on the auxiliary guide 11 adjacent the resonator of the transmitter-receiver switch 17. This second solenoid 67 is mounted on the wider wall of the guide 11 opposite that on which the first solenoid 49 is mounted and also includes a movable rod or plunger 69 mounted at substantially right angles to the auxiliary guide 11 in line with a second opening 71 therein. The mounting 79 for the second plunger 69 is also arranged to form a quarter-wave length choke at the opening 71 to prevent passage of electromagnetic energy therethrough. The second plunger 69 is normally held outside the guide 11 by energization of the coil 73 of the solenoid 67 from the direct current source 61 through another switch 75. When switch 75 is opened, a spring 77 forces the second plunger 69 into the guide 11. Movement of the second plunger 69 into the guide is adjusted by the threaded connection at 81 to establish a short circuit across the guide and to reduce, effectively, the size of the passageway through the guide to a point below the cut off dimension whereby passage of electromagnetic waves therethrough is substantially prevented over a very wide frequency range. To establish the short circuit the second plunger 69 is caused to move substantially across and into contact with the opposite wall of the guide. If it does not actually engage the opposite wall, it is sufficiently close thereto and has sufficient area at its end to establish a large capacitance which is of low impedance to the high frequency currents and an effective short circuit. The diameter of the plunger is also of such size that the dimensions of the guide are reduced below the cut off point. Consequently, when the apparatus is shut down and the switch 35 for the auxiliary electrode 31 of the transmitter receiver switch is opened as are the switches 59 and 75 for the solenoids 49 and 67 the plunger 69 will be positioned within the guide 11 and will prevent passage of signals through the resonator of sufficient strength to damage the crystal 13.

The second plunger is, of course, effective if used any place in a hollow guide to cause very substantial attenuation. However, the effect for any given size of plunger causing less than complete cut off is increased if the plunger is positioned a distance of the order of one-half wave length in the guide behind the resonator of the transmitter-receiver switch. Then the short-circuiting effect of the plunger acts to enforce the low impedance effect at the resonator for waves of other than the resonant frequency.

To avoid conflict between the plungers 51 and 69 of the two solenoids 49 and 67, the switches 59 and 75 controlling the solenoids may have an interlock 83 provided therebetween whereby the first solenoid coil 57 cannot be energized to move the plunger 51 thereof into the guide 11 unless the second solenoid coil 73 is energized to move its plunger 69 out of the guide 11.

It is to be understood that while we have shown the plungers 51 and 69 operated by solenoids, they may, if desired, be operated by other means or even manually. In actual practice the apparatus is ordinarily inaccessible to the operator so that solenoid operation is particularly advantageous. Moreover, while we have shown the plungers used with rectangular guides, they may, of course, be used with guides having other cross-sectional shapes.

While we have shown and described a specific embodiment of our invention, we do not wish to restrict our invention thereto, as we are aware that many modifications thereof may be made without departing from the spirit of the invention.

We claim as our invention:

1. In a transmission system for electromagnetic waves, a wave guide having an opening in a wall thereof, and a conductive plunger movably mounted outside said guide at said opening and a solenoid operable to effect movement of said plunger into and out of said guide through said opening to change discretely the characteristics of said system with respect to the conduction of waves therethrough.

2. In a transmission system for electromagnetic waves, a wave guide having an opening in a wall thereof, a conductive plunger and means for mounting said plunger for movement through said opening, said mounting means including means cooperating with said plunger to form a choke substantially preventing energy loss through said opening, and a solenoid connected to said plunger and operable to move said plunger into and out of said guide through said opening to cause discrete changes in the characteristics of said system with respect to the conduction of waves therethrough.

3. In a transmission system for electromagnetic waves, a wave guide having an opening in a wall thereof, a conductive plunger slidably mounted substantially perpendicular to said guide at said opening and a solenoid adapted to move said plunger into and out of said guide through said opening to cause discrete changes in the characteristics of said system with respect to the conduction of waves therethrough.

4. In a transmission system for electromagnetic waves, a wave guide having an opening in a wall thereof, and a solenoid including a conductive plunger movably mounted on said guide at said opening, said solenoid being operable to effect movement of said plunger into and out of said guide through said opening to cause discrete changes in the characteristics of said system with respect to the conduction of waves therethrough.

5. In a transmission system for electromagnetic waves, a cavity resonator into which electromagnetic waves are to be introduced, a wave guide coupled to said resonator to conduct electromagnetic waves from said resonator, said system including said resonator being tuned to a first predetermined frequency whereby waves of said first frequency may be conducted therethrough without substantial attenuation, said guide having an opening therein adjacent said resonator, and a conductive plunger movably mounted at said opening and a solenoid adapted to move abruptly said plunger into said guide through said opening to introduce a reactance in said system effective to retune said system including said resonator to a second predetermined frequency whereby waves of said second frequency may be conducted therethrough without substantial attenuation.

6. In a transmission system for electromagnetic waves, a cavity resonator into which electromagnetic waves are to be introduced, a wave guide coupled to said resonator to conduct electromagnetic waves from said resonator, said system including said resonator being tuned to a first predetermined frequency whereby waves of said first frequency may be conducted therethrough without substantial attenuation, said guide having an opening therein adjacent said resonator, and a conductive plunger movably mounted substantially perpendicular to said guide at said opening and a solenoid adapted to abruptly move said plunger a preselected distance into said guide through said opening to introduce a reactance in said system effective to retune said system including said resonator to a second predetermined frequency whereby waves of said second frequency may be conducted therethrough without substantial attenuation.

7. In a transmission system for electromagnetic waves, a cavity resonator into which electromagnetic waves are to be introduced, a wave guide coupled to said resonator to conduct electromagnetic waves from said resonator, said system including said resonator being tuned to a first predetermined frequency whereby waves of said first frequency may be conducted therethrough without substantial attenuation, said guide having an opening therein adjacent said resonator, a conductive plunger, and means including a solenoid for slidably mounting said plunger at said opening, said plunger being adapted to be abruptly slid a preselected distance into said guide through said opening to introduce a reactance in said system effective to retune said system including said resonator to a second predetermined frequency whereby waves of said second frequency may be conducted therethrough without substantial attenuation, said mounting means including means cooperating with said plunger to form a choke substantially preventing energy loss through said opening.

8. In a transmission system for electromagnetic waves, a cavity resonator into which electromagnetic waves are to be introduced, a wave guide coupled to said resonator to conduct electromagnetic waves from said resonator, said system including said resonator being tuned to a first predetermined frequency whereby waves of said first frequency may be conducted therethrough without substantial attenuation, said guide having an opening therein adjacent said resonator, and a solenoid including a conductive plunger slidably mounted at said opening, said solenoid being operable to effect movement of said plunger a preselected distance into said guide through said opening to introduce a reactance in said system effective to retune said system including said resonator to a second predetermined frequency whereby waves of said second frequency may be conducted therethrough without substantial attenuation.

9. In a transmission system for electromagnetic waves within a predetermined band of frequencies, a wave guide having an opening in a wall thereof, a conductive plunger, and means including a solenoid for effecting discrete movement of said plunger into said guide through said opening, said mounting including means cooperating with said plunger to form a choke substantially preventing loss of electromagnetic energy through said opening to reduce the effective size of said guide below that necessary to permit a substantially unattenuated conduction therethrough of waves within said band.

10. In a transmission system for electromagnetic waves within a predetermined band of frequencies, a wave guide having an opening in a wall thereof, and a solenoid including a conductive plunger slidably mounted substantially perpendicular to said guide at said opening, said solenoid being operable to slide said plunger into and out of said guide through said opening with said plunger being of a size effective when moved into said guide to reduce the effective cross-sectional area of said guide below that necessary to permit a substantially unattenuated conduction therethrough of waves within said band.

11. In a transmission system for electromagnetic waves within a predetermined band of frequencies, a cavity resonator into which electromagnetic waves are to be introduced, a wave guide coupled to said resonator to conduct electromagnetic waves from said resonator, said guide having an opening therein a distance from the resonator of the order of an even number of half wave lengths in the guide, and a conductive plunger movably mounted substantially perpendicular to said guide at said opening and adapted to be moved into said guide through said opening to establish in effect a short circuit across said guide with said plunger being of a size effective when moved into said guide to reduce the effective cross-sectional area of said guide below that necessary to permit a substantially unattenuated conduction therethrough of waves within said band.

12. For use with a radar-beacon system including a transmitter; an antenna into which said transmitter operates; a receiver capable of receiving the radar frequency; and the beacon frequency; the combination comprising a wave guide section for interconnecting said antenna and said receiver and an electrical switching mechanism including a solenoid controlled conductive plunger adapted for discrete movement into and out of said wave guide for rendering said wave guide selectively conductive to said radar or beacon frequencies.

13. For use with a communication system including an antenna, a receiver capable of receiving a first frequency and a second frequency; the combination comprising a common conductor comprising a wave guide for interconnecting said antenna and said receiver and an electrical switching mechanism including a solenoid operated conductive plunger adapted for discrete movement into and out of said wave guide for rendering said conductor selectively conductive to said first or said second frequencies.

14. For use with a communication system including an antenna; the combination comprising a receiver having a converter, a first local oscillator cooperative with said receiver to render it capable of receiving a first frequency, a second local oscillator cooperative with said receiver to render it capable of receiving a second frequency, a common conductor comprising a wave guide interconnecting said local oscillators and said converter with said antenna and an electrical switching mechanism including a solenoid operated conductive plunger adapted for discrete movement into and out of said wave guide for rendering said conductor selectively conductive to said first frequency or to said second frequency.

15. For use with a communication system including an antenna and a receiver; the combination comprising a conductor comprising a wave guide for interconnecting said receiver and said antenna and an electrical switching mechanism including a solenoid operated conductive plunger adapted for discrete movement into said wave guide for rendering said conductor non-conductive to the radiation received by said antenna.

16. For use with a communication system including an antenna and a receiver having a supply of power and a converter of the crystal type; the combination comprising a conductor comprising a wave guide for interconnecting said receiver and said antenna and an electrical switching mechanism including a solenoid operated conductive plunger adapted for discrete movement into said wave guide to be actuated when said receiver is deprived of power for rendering said conductor non-conductive to the radiation received by said antenna.

17. A communication system including an antenna, a receiver having a converter of the type damaged when excessive energy is impressed thereon, terminals to be energized to supply power to said converter, a device for protecting said converter from excessive energy, said device being capable of protecting said converter when said terminals are energized and incapable when said terminals are deenergized, a conductor comprising a wave guide connecting said receiver to said antenna through said protective device and an electrical switching mechanism, said switching mechanism including a solenoid actuated conductive plunger adapted for discrete movement into said wave guide, to be actuated when said terminals are deenergized, for rendering said conductor non-conductive to energy received by said antenna.

18. A communication system including an antenna, a receiver having a converter of the type damaged when excessive energy is impressed thereon, a device for protecting said converter from excessive energy, terminals to be energized to render said protective device capable of protecting said converter, a conductor including a wave guide connecting said receiver to said antenna through said protective device and an electrical switching mechanism, said switching mechanism including a solenoid operated conductive plunger adapted for abrupt movement into said wave guide, to be actuated when said terminals are deenergized, for rendering said conductor non-conductive to energy received by said antenna.

19. A communication system including an antenna, a receiver having a converter of the type damaged when excessive energy is impressed thereon, a device for protecting said converter from excessive energy, terminals to be energized to render said protective device capable of protecting said converter, a wave guide connecting said receiver to said antenna through said protective device and an electrical switching mechanism, including a solenoid controlled conductive plunger adapted for discrete movement into said wave guide, to be actuated when said terminals are deenergized, for rendering said wave guide non-conductive to energy received by said antenna.

CARL G. MATLAND.
LEON KATZ.

REFERENCES CITED

The following references are of record in the file of this patent:

UNITED STATES PATENTS

| Number | Name | Date |
| --- | --- | --- |
| 2,158,584 | Koster | May 16, 1939 |
| 2,374,810 | Fremlin | May 1, 1945 |

(Other references on following page)

UNITED STATES PATENTS

| Number | Name | Date |
|---|---|---|
| 2,373,233 | Dow | Apr. 10, 1945 |
| 2,401,425 | Hershberger | June 4, 1946 |
| 2,401,489 | Lindenblad | June 4, 1946 |
| 2,404,082 | Mouromtseff | July 16, 1946 |
| 2,404,116 | Wolowicz | July 16, 1946 |
| 2,407,847 | Peterson | Sept. 17, 1946 |
| 2,412,159 | Leeds | Dec. 3, 1946 |
| 2,413,171 | Clifford | Dec. 24, 1946 |
| 2,415,242 | Hershberger | Feb. 4, 1947 |
| 2,418,124 | Kandoian | Apr. 1, 1947 |
| 2,418,156 | Bollman | Apr. 1, 1947 |
| 2,427,029 | Stearns | Sept. 9, 1947 |
| 2,427,107 | Landon | Sept. 9, 1947 |
| 2,427,191 | Brink | Sept. 9, 1947 |
| 2,433,387 | Mumford | Dec. 30, 1947 |

OTHER REFERENCES

Practical Analysis of U. H. F. by Meagher and Markley, RCA Service Co., Inc., Camden, New Jersey; August 1943, 2nd Edition.